Aug. 9, 1938. M. A. MARTIN 2,126,687
CONDUIT FOR REFRIGERANT SYSTEMS
Filed Nov. 7, 1935 2 Sheets-Sheet 1
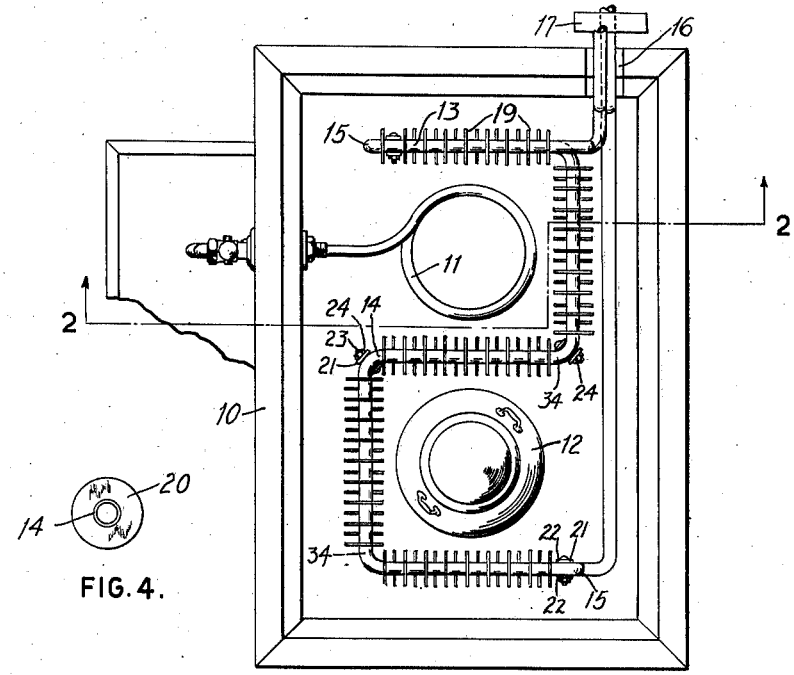
FIG. 1.
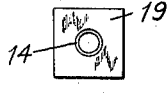
FIG. 3.
FIG. 4.
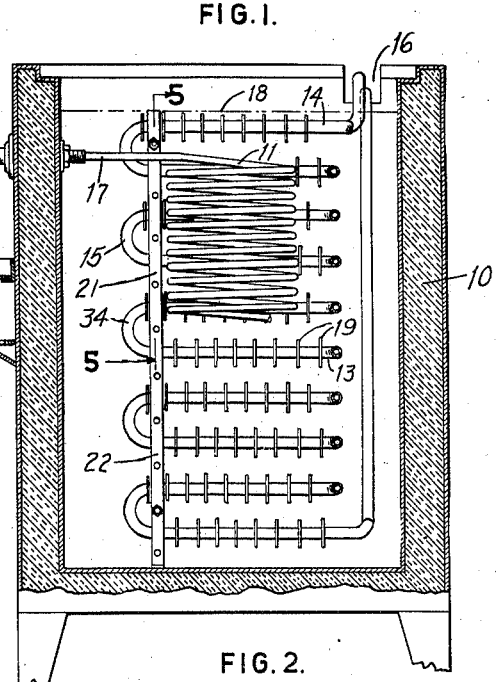
FIG. 2.
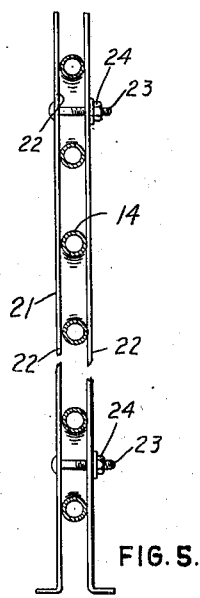
FIG. 5.
INVENTOR.
MICHAEL A. MARTIN.
His ATTORNEYS Aug. 9, 1938.   M. A. MARTIN   2,126,687
CONDUIT FOR REFRIGERANT SYSTEMS
Filed Nov. 7, 1935   2 Sheets-Sheet 2
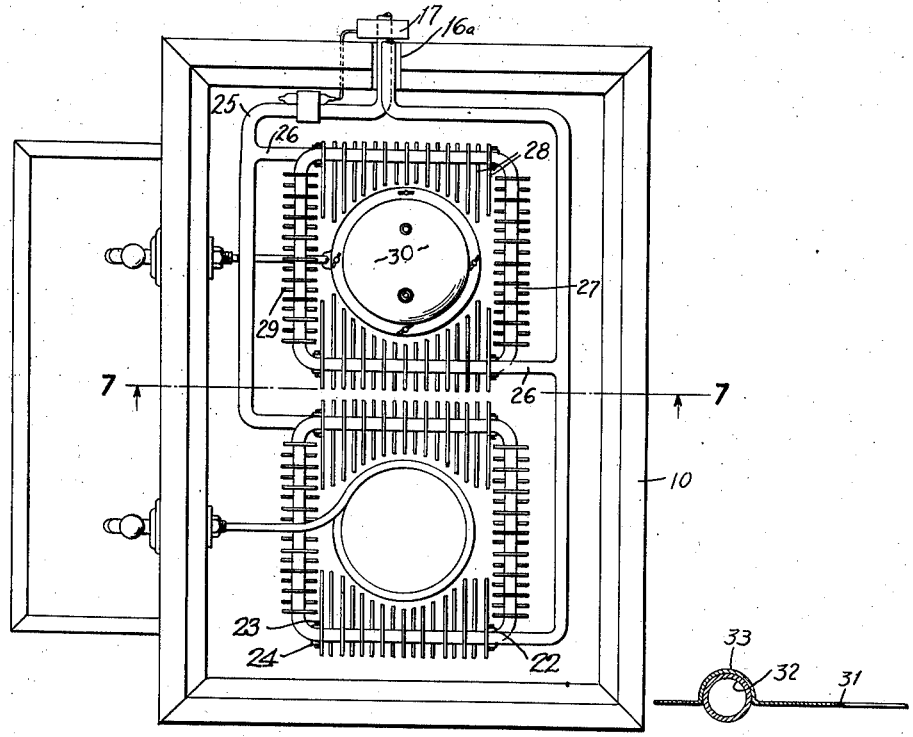
FIG. 6.
FIG. 9.
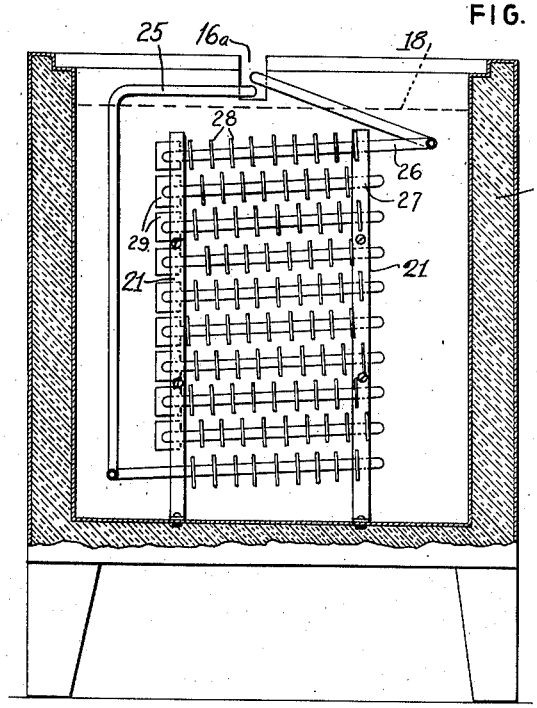
FIG. 7.
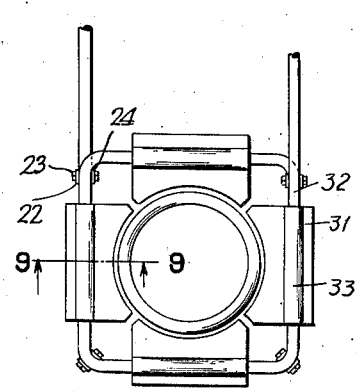
FIG. 8.
INVENTOR.
MICHAEL A. MARTIN.
BY
His ATTORNEYS Patented Aug. 9, 1938

2,126,687

UNITED STATES PATENT OFFICE 2,126,687

CONDUIT FOR REFRIGERANT SYSTEMS

Michael A. Martin, Erie, Pa.

Application November 7, 1935, Serial No. 48,721

4 Claims. (Cl. 62—126)

This invention relates to automatic refrigerating systems employing an evaporator and a liquid heat transfer agent, and more particularly to an improved evaporator for such system.

Automatic refrigerating systems are commonly employed to cool liquids such as beer, milk, and the like, and this is commonly effected by placing the liquid in a container such as coils or cans disposed in a heat insulated cabinet provided with an evaporator and water or an anti-freeze solution substantially immersing the liquid container and the evaporator to facilitate heat transfer therebetween.

The evaporator may be embodied in various forms but usually comprises a plurality of interconnected adjacent tubes of heat conducting material through which a volatile refrigerant fluid is passed. The expansion of the volatile refrigerant fluid extracts heat from the surrounding liquid heat transfer agent such as an anti-freeze solution which in turn reduces the temperature of the liquid within the container disposed in the cabinet. However, this heat transfer is relatively slow due to the limited surface of the evaporator tubes in contact with the anti-freeze solution and the lack of circulation of the anti-freeze solution.

It is particularly desirable in cooling beer or milk that a rapid heat transfer be effected since an increased withdrawal of beer through the coils results in warm, relatively unpalatable beer being dispensed, and in the case of milk unduly raises the bacteria count. The use of a larger evaporator is not only more expensive initially and in operating but restricts the space available in the cabinet for the liquid container.

Automatic refrigerant systems of this type usually are of the compressor-condensor type and if the compressor speed is increased to an appreciable degree in an attempt to maintain a desired low temperature, the increased volatilization of the refrigerant fluid results in rapid reduction of the temperature of the anti-freeze solution in the lower portions of the cabinet where volatilization normally takes place and may result in freezing of the beer and bursting of the coils.

I have provided an improved evaporator for such systems wherein I employ transverse fins in association with the evaporator tubes to greatly increase the heat conduction area in contact with the anti-freeze solution, resulting in a considerably increased heat exchange rate for an equivalent size evaporator and compressor unit. Additionally, this increased rate of heat exchange stimulates circulation of the anti-freeze solution, further improving the efficiency of the system.

The evaporator which I have provided is relatively economical of manufacture and installation since the tube is manually deformable and is adjustable to accommodate cabinets of varying dimensions.

It is a primary object of my invention, therefore, to provide an improved evaporator for automatic refrigerant systems employing a liquid heat transfer agent whereby the heat transfer rate is materially increased for a given evaporator.

Another object of my invention is to provide an evaporator of the above type for automatic refrigerant systems employing a liquid heat transfer agent whereby circulation of the heat transfer agent is stimulated.

Another object of my invention is to provide an evaporator of the above type which is easily adjustable to accommodate cabinets of varying sizes.

Another object of my invention is to provide an evaporator of the above type which is relatively economical of manufacture and installation and which may be easily deformed to provide a maximum evaporator surface adjacent the container to be cooled.

Other objects of my invention and the invention itself will become increasingly apparent from consideration of the following description and drawings wherein:

Fig. 1 is a plan view of a preferred embodiment of my invention adapted to a heat insulated cabinet, the cabinet having the cover removed for illustrative purposes;

Fig. 2 is a sectional elevational view taken along the lines 2—2 of Fig. 1;

Fig. 3 is an enlarged cross-sectional view through the evaporator tube showing a preferred type of fin;

Fig. 4 is a view similar to Fig. 3, showing a modified form of fin;

Fig. 5 is an elevational sectional view taken along the lines 5—5 of Fig. 2, showing a spacing and supporting standard which I may employ;

Fig. 6 is a plan view of a modification of my invention;

Fig. 7 is a fragmentary elevational view of the modification of Fig. 6;

Fig. 8 is a plan view of a further modification of my invention; and

Fig. 9 is a section along line 9—9 of Fig. 8.

Referring now to the drawings, I have indicated generally at 10 a conventional heat insulated cabinet having disposed therein containers for the liquid to be cooled, the containers comprising beer coils 11 and a milk can 12.

I have indicated generally at 13 an evaporator preferably formed of a continuous length of heat conducting material such as copper, although any suitable material may be used, and the tubes may consist of sealedly connected shorter length tubing. The evaporator tube indicated at 14 is preferably manually deformable and bent to resemble in plan view (Fig. 1) a series of reversely connected U-formations bent as indicated at 15 to provide a plurality of underlying formations similar to the top formation, the number of successive vertically disposed formations being dependent upon the evaporator surface desired. The uppermost end of the tube 13 is projected through a slot 16 provided preferably in an end wall of the cabinet, and the lowermost tube end is disposed adjacent the cabinet base and then extended vertically to also project through the slot 16. These ends are connected in circuit externally of the cabinet with the usual compressor and condenser. The refrigerant fluid in liquid form preferably enters the lowermost portion of the evaporator and the volatilized fluid is returned to the compressor from the uppermost evaporator portion.

The flow of refrigerant fluid is automatically controlled either by a thermostatic valve or a pressure valve, both well known in the art. The valve is generally indicated at 17 to control flow from the condenser and, if a thermostatic type, will remain open until a predetermined minimum temperature of the antifreeze solution is reached, which through a capillary tube projected into the solution, controls the valve. The valve opens at a predetermined maximum temperature. The pressure valve operates to maintain a predetermined back-pressure in the evaporator.

In cooling liquids such as beer, which are passed through a coil to a dispensing faucet, it is customary to have the refrigerant fluid enter the lowermost evaporator coil since the greatest heat exchange due to volatilization of the liquid will then be effected in the lower portion of the cabinet, resulting in a maximum cooling effect on the warm beer entering the coils from the source of supply.

The rapidity of the heat exchange or the rate at which the liquid is cooled is dependent upon the surface area provided by the evaporator tubing 14 in contact with the heat transfer liquid such as water and calcium chloride which will preferably be of a level indicated at 18, and to increase this surface I provide a plurality of transverse fins 19 encircling the tube 14 in longitudinally spaced relation. The fins 19 may be formed of copper or suitable conducting material and affixed to the tube 14 by sweating or similar means and are preferably square in contour as illustrated in Fig. 3. The spacing will be relatively greater in portions of the tube such as at 34 to permit bending without interference by overlapping fins, and this spacing may be varied dependent upon the cabinet and the number and size of the containers.

Although I preferably employ a fin square in contour, I contemplate that any desired contour may be used, such as a circular fin 20 illustrated in Fig. 4.

The evaporator is preferably supported by means of standards 21 disposed at the corners of the evaporator and comprising parallel strips of sheet metal 22—22 clamping the successive layers of tubing therebetween, the strips 22 being clamped together by suitable means such as bolts 23 projected through aligned perforations in the strips and retained by a nut 24. This type standard permits of the successive underlying layers of tubing to be disposed in more compact form or moved farther apart as desired to accommodate varying height cabinets or alter the evaporator surface for a given size cabinet. Thus, the conventional height evaporator may be adapted to cabinets 33% greater or less in height.

Referring now to Figs. 6 and 7, I have shown a modification of my invention wherein the cabinet 10 has another form of evaporator disposed therein, a refrigerant conduit 25 from the condenser being projected through the slot 16a; the flow of refrigerant fluid being controlled by a valve 17, as previously described.

A lateral conduit 26 supplies refrigerant fluid to an evaporator generally indicated at 27. The evaporator 27 comprises a plurality of superposed inter-connected coils generally square in contour and preferably formed of continuous copper tubing. The tubing is provided with transverse fins, the oppositely disposed fins 28 being of varying length inwardly to form an arcuate contour, and the other fins 29 being preferably of constant length.

A tank type beer container 30 is disposed within the evaporator, the tank being supplied in the usual manner from a supply source externally of the cabinet and dispensed by a faucet or the like. The fins 28 terminate inwardly closely adjacent the tank 30, allowing sufficient clearance for removal of the tank or evaporator and thus rapidly conducts heat from the tank or anti-freeze solution in which the container is immersed. The coils of evaporator 27 may be supported by standards 21 in the manner illustrated in Fig. 5.

Referring now to Figs. 8 and 9, I have shown a modification of my invention wherein a different form of fin is provided to be sweated, soldered, or by other means known to the art, attached to the evaporator tubing, 32. The fins 31, a cross-sectional view of one of them being shown in Fig. 9, are made of sheet metal and have an intermediate portion press-formed as at 33 to partly encircle the evaporator tubing 32 and extending along the evaporator tubing. One edge of each fin, adjacent to the coil or container, is concavely shaped or generally concentric with the coil or container, so that all of the fins as a whole define a cylindrical wall of edges around the coil or container. The coils of the evaporator tubing 32 may be supported and maintained in spaced relation by standards 21 or similar supports.

It will be observed that the supports for the coils above described may be assembled with the coils making a complete unit thereof which may be inserted into a commercial refrigerator cabinet 10 and thus my invention is adaptable to be practiced without the necessity of constructing a cabinet especially therefor.

Although I have shown and described modifications of my invention, I contemplate that numerous and extensive departures may be made therefrom without departing from the spirit of my invention and the scope of the appended claims.

Having thus described my invention, what I claim is:

1. An evaporator adapted to a refrigerant system for fluids comprising a manually deformable tube of heat conducting material, a plurality of heat conducting fins spaced therealong, said fins lying generally in a plane including the tube axis, the fins extending laterally from the tube and provided with a peripheral contour whereby the tube may be deformed to have said fins closely encircle a fluid container.

2. In a refrigerant system for liquids, the combination of a cabinet adapted to contain an anti-freeze solution, a liquid container in the cabinet, an evaporator in the cabinet adapted to have a fluid refrigerant circulated therethrough, the evaporator comprising successive vertically spaced inter-connected layers of heat conducting tubing adjacent at least a major portion of the liquid container side walls, a plurality of vertically extending supports adjustably engaging the tubing whereby the height of the evaporator may be altered and a plurality of spaced fins of high heat conduction material secured to the tube and extending laterally therefrom towards and adjacent to the liquid container whereby heat may be rapidly extracted from the liquid under the joint influence of said fins and the anti-freeze solution.

3. An evaporator unit adapted to receive a generally circular liquid container, the unit comprising manually deformable continuous tubing formed in successive overlying generally square portions, a plurality of fins of heat conducting material spaced axially along the tubing and extending transversely therefrom, the fins being formed to terminate closely adjacent and substantially equi-distant from the container walls, and vertically extending support means clampingly engaging each of the successive overlying tube portions adjustable to vary the unit height.

4. An evaporator unit for refrigerant systems adapted to encircle a generally cylindrical container, the unit comprising a continuous tube formed to provide successive generally square form overlying portions, the tube ends being adapted to connect with a refrigerant supply and return line, a plurality of fins associated with each of said overlying portions, each of said fins being generally horizontally disposed and having an inwardly extending arcuate portion adapted to terminate closely adjacent to the cylinder walls whereby the fins of each overlying portion define a generally circular opening, and vertically extending support means maintaining the overlying portions in spaced relation.

MICHAEL A. MARTIN.